Nov. 7, 1933.  A. KRAJNC  1,933,673
SUPPORT FOR COMBINATION BRIDGE LAMPS, BIRD CAGES, AND THE LIKE
Filed May 3, 1932
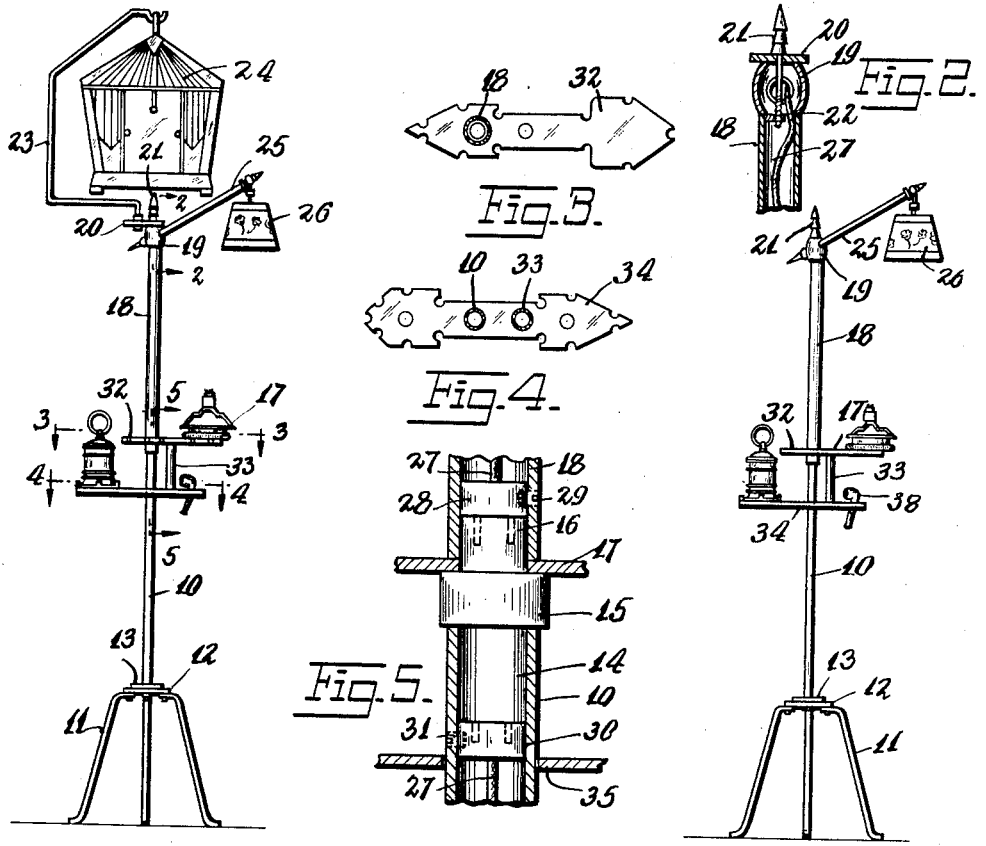
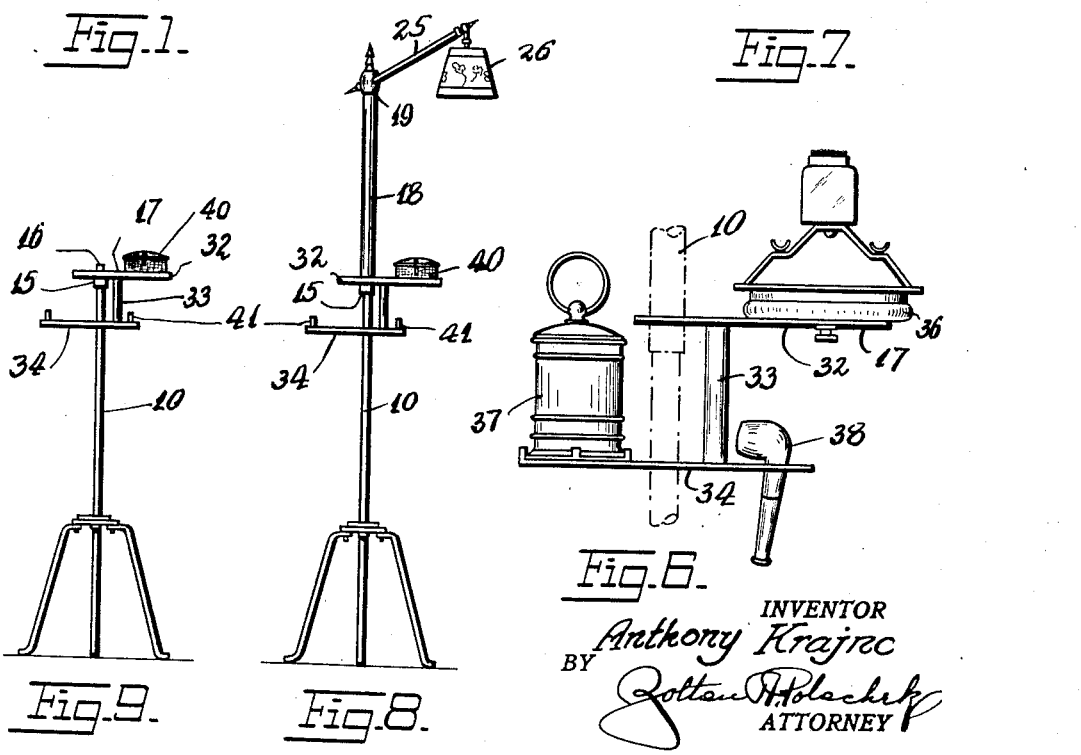
INVENTOR
Anthony Krajnc
BY
Zoltan H. Polschek
ATTORNEY Patented Nov. 7, 1933

1,933,673

UNITED STATES PATENT OFFICE 1,933,673

SUPPORT FOR COMBINATION BRIDGE LAMPS, BIRD CAGES, AND THE LIKE

Anthony Krajnc, New York, N. Y.

Application May 3, 1932. Serial No. 608,898

2 Claims. (Cl. 248—2)

This invention relates to new and useful improvements in supports for a combination bridge lamp, bird cage and the like.

Furthermore, the invention proposes the arrangement of a peg element supported upon a bottom support tube and adapted to hold a top support tube and equipped with plug elements to provide a circuit through the parts.

The invention has for a still further object the construction of a device of the class described which is of simple durable construction, dependable in use and efficient in operation, and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of a device constructed according to this invention.

Fig. 2 is a fragmentary sectional view taken on the line 2—2 of Fig. 1.

Fig. 3 is a horizontal sectional view taken on the line 3—3 of Fig. 1.

Fig. 4 is a horizontal sectional view taken on the line 4—4 of Fig. 1.

Fig. 5 is a fragmentary enlarged vertical sectional view taken on the line 5—5 of Fig. 1.

Fig. 6 is an enlarged detailed view of a portion of Fig. 1.

Fig. 7 is a view similar to Fig. 1 but showing the bird cage removed.

Fig. 8 is a view similar to Fig. 7 but showing a sewing outfit in lieu of the smoker's outfit.

Fig. 9 is a view similar to Fig. 8 but showing the lamp removed.

The combination article, according to this invention, comprises a vertical bottom support tube 10 rotatively supported on a stand 11. The stand 11 comprises a plurality of feet secured upon a disc 12 supporting a bearing 13 which rotatively holds the lower end of the tube 10. A peg 14 is engaged in the top of the tube 10 and has a central protuberance 15 and a top portion 16. A table element 17 is rotatively supported upon the protuberance 15. A top support tube 18 engages upon the top portion 16 of the peg.

A bracket 19 rests upon the top of the tube 18 and a support rod 20 upon the bracket 19. A screw 21 engages through the rod 20 and the bracket 19 and threadedly engages into a lug 22 secured within the top of the tube 18. A cage support rod 23 is mounted upon the rod 20 and supports a bird cage 24 as shown in Fig. 1. From the bracket 19 an arm 25 projects which supports a bridge lamp 26. A cable 27 for leading the electric current to the lamp passes through the arm 25 and through the tube 18 and connects with a plug element 28 secured near the lower end of the tube 18.

A plug 28 is held in position within the tube 18 by a screw 29. The plug 28 engages into a socket in the top of the peg portion 16 and this socket is connected with a corresponding socket upon the lower end of the peg 14 which is adapted to connect with a plug 30 secured within the tube 10 by a screw 31. The details of the electrical connections are not shown on the drawing since they will be obvious to anyone skilled in the art. The intention is that the upper tube 18 may be lifted off from the peg portion 16 whenever desired. Similarly, the peg portion 14 may be lifted out from the top of the tube 10 whenever desired. The cable 27 may continue and pass out from the bottom of the tube 10.

In Fig. 6 a detail of the carriage 17 is disclosed. It should be noticed that the carriage comprises an upper arm 32 secured by a vertical member 33 together with a lower arm 34. The upper arm 32 is rotative upon the peg portion 16 and rests upon the protuberance 15 while the lower arm 34 is formed with an aperture 35 for the passage of the tube 10. Thus, the carriage may be swung around with the protuberance 15 as it is pivoted. A smoker's tray 36 is mounted upon the top of the arm 32. A tobacco humidor 37 is mounted upon the arm 34. A pipe 38 is also shown supported upon the lower arm 34.

In Fig. 7 the device is shown in use with the bird cage removed. This may be done by first removing the screw 21 and then lifting off the cage which is secured upon the rod 20. The screw 21 may then be replaced so as to hold the bracket 19. In other respects this form is similar to the previous form.

In Fig. 8 another variation of the invention has been disclosed in which a sewing basket 40 is shown mounted upon the top arm 32 in lieu of the smoker's ash tray. The lower arm 34 is shown provided with pegs 41 adapted to receive thread spools not shown on the drawing.

In Fig. 9 another variation of the invention has been disclosed in which the top tube 18, together with the bridge lamp 26 has been removed so that merely the carriage 17 remains.

The intention is that the combination device be used in any of the forms shown on the drawing. An important feature of the invention is the provision of the peg 14 with the enlarged part 15 which allows for the removal of the upper tube 18 and simultaneously forms a support for the carriage 17.

While I have shown and described a preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a support for a combination bridge lamp and bird cage and smoking set, a bottom tube, an element mounted on the bottom tube and having a protuberance, a top tube mounted upon said element, a shelf rotatively mounted upon said protuberance, a second shelf freely mounted upon the bottom tube, and a handle connected between the two shelves.

2. In a support for a combination bridge lamp and bird cage and smoking set, a protuberance, an upper and a lower peg portion projecting therefrom, a shelf rotatively mounted upon the upper peg portion and resting upon the protuberance, a bottom tube engaging upon the lower peg portion, a second shelf freely engaged upon the bottom tube, and a handle connected between the first and second shelves.

ANTHONY KRAJNC.